(12) United States Patent
Tiirola et al.

(10) Patent No.: US 8,437,416 B2
(45) Date of Patent: May 7, 2013

(54) COORDINATED CYCLIC SHIFT AND SEQUENCE HOPPING FOR ZADOFF-CHU, MODIFIED ZADOFF-CHU, AND BLOCK-WISE SPREADING SEQUENCES

(75) Inventors: Esa Tiirola, Kempele (FI); Kari Hooli, Oulu (FI); Kari Pajukoski, Oulu (FI); Klaus Hugl, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/338,348

(22) Filed: Dec. 28, 2011

(65) Prior Publication Data

US 2012/0201275 A1    Aug. 9, 2012

Related U.S. Application Data

(62) Division of application No. 12/150,807, filed on Apr. 30, 2008.

(60) Provisional application No. 60/927,054, filed on Apr. 30, 2007, provisional application No. 60/964,878, filed on Aug. 15, 2007.

(51) Int. Cl.
*H04K 1/10* (2006.01)
*H04L 27/28* (2006.01)

(52) U.S. Cl.
USPC ........... 375/260; 375/131; 375/132; 375/138; 375/140; 375/141; 714/701; 370/308; 370/342

(58) Field of Classification Search ................... 375/260, 375/131, 132, 138, 140, 141; 714/701; 370/308, 370/342
See application file for complete search history.

(56) References Cited

U.S. PATENT DOCUMENTS

| 5,920,591 A | 7/1999 | Fukasawa et al. ............ 375/142 |
| 6,542,478 B1 | 4/2003 | Park .............................. 370/308 |

(Continued)

FOREIGN PATENT DOCUMENTS

| EP | 0593255 A1 | 4/1994 |
| RU | 2234196 C2 | 8/2004 |

(Continued)

OTHER PUBLICATIONS

3GPP TSG RAN WG1 Meeting #47bis, R1-070394, "Multiplexing of L1/L2 Control Signals between UEs in the absence of UL data", Jan. 15-19, 2007, 5 pgs.

(Continued)

*Primary Examiner* — Phuong Phu
(74) *Attorney, Agent, or Firm* — Harrington & Smith

(57) ABSTRACT

A reference signal cyclic shift (CS) is quantized as a combination of a cell specific CS with an outcome of a pseudo-random hopping, and an indication of the cell specific CS is broadcast in the cell. In one embodiment the CS is quantized as a modulo operation on a sum of the cell specific CS, the outcome of the pseudo-random hopping, and a user specific CS, in which case an indication of the user specific CS is sent in an uplink resource allocation and a user sends its cyclically shifted reference signal in the uplink resource allocated by the uplink resource allocation. The CS may also be quantized according to length of the reference signal as cyclic_shift_symbol=(cyclic_shift_value*length of the reference signal)/12; where cyclic_shift_value is between zero and eleven and cyclic_shift_symbol is the amount of CS given in reference signal symbols.

29 Claims, 12 Drawing Sheets

U.S. PATENT DOCUMENTS

| | | | |
|---|---|---|---|
| 7,673,192 B2 * | 3/2010 | Currivan et al. | 714/701 |
| 8,098,745 B2 * | 1/2012 | Bertrand et al. | 375/260 |
| 2006/0056360 A1 | 3/2006 | Parkvall et al. | 370/335 |
| 2008/0235314 A1 * | 9/2008 | Lee et al. | 708/426 |
| 2009/0325513 A1 | 12/2009 | Iwai et al. | 455/91 |
| 2010/0002671 A1 | 1/2010 | Iwai et al. | 370/342 |
| 2010/0105405 A1 | 4/2010 | Vujcic | 455/452.1 |
| 2010/0220664 A1 * | 9/2010 | Hooli et al. | 370/329 |
| 2011/0002321 A1 | 1/2011 | Iwai et al. | 370/342 |
| 2011/0013715 A1 | 1/2011 | Lee et al. | 375/285 |

FOREIGN PATENT DOCUMENTS

| | | |
|---|---|---|
| WO | WO 9702561 A1 | 1/1997 |
| WO | WO 2004114549 | 12/2004 |
| WO | WO 2007021157 A1 | 2/2007 |

OTHER PUBLICATIONS

3GPP TSG RAN WG1 Meeting #48, R1-070748, Cyclic-shift hopping for uplink sounding reference signal, Feb. 12-16, 2007, 7 pgs.

3GPP TSG RAN WG1 Meeting #47bis, R1-070078, "Non-coherent ACK/NAK signaling using code sequences as indicators in E-UTRA uplink", Jan. 15-19, 2007, 7 pgs.

3GPP TSG RAN WG1 Meeting #49bis, R1-073149, "Cyclic Shift Hopping of UL ACK Channels", Jun. 25-29, 2007, 6 pgs.

3GPP TS 36.211 V1.0.0, "Physical Channels and Modulation (Release 8)", Mar. 2007, 30 pgs.

3GPP TR 25.814 V7.1.0, Physical layer aspects for evolved Universal Terrestrial Radio Access (UTRA) (Release 7), Sep. 2006, 132 pgs.

"Uplink reference signals", Ericsson, TSG-RAN WG1 #47, R1-063128, Nov. 2006, 5 pgs.

"Sequence Hopping and Cyclic-Shift Value Hopping for Uplink Reference Signal in E-UTRA", NTT DoCo.Mo, et al., 3GPP TSG RAN WG1 Meeting #48bis, R1-071643, Mar. 2007, 4 pgs.

"Cyclic Shift Hopping and DM RS Signaling", Nokia Siemens Networks, et al., 3 GPP TSG RAN WG1 Meeting #49, R1-072294, May 2007, 4 pgs.

"On construction and signaling of RACH preambles", Nokia et al., 3GPP TSG RAN WG1 #48bis, R1-071661, Mar. 2007, 2 pgs.

\* cited by examiner

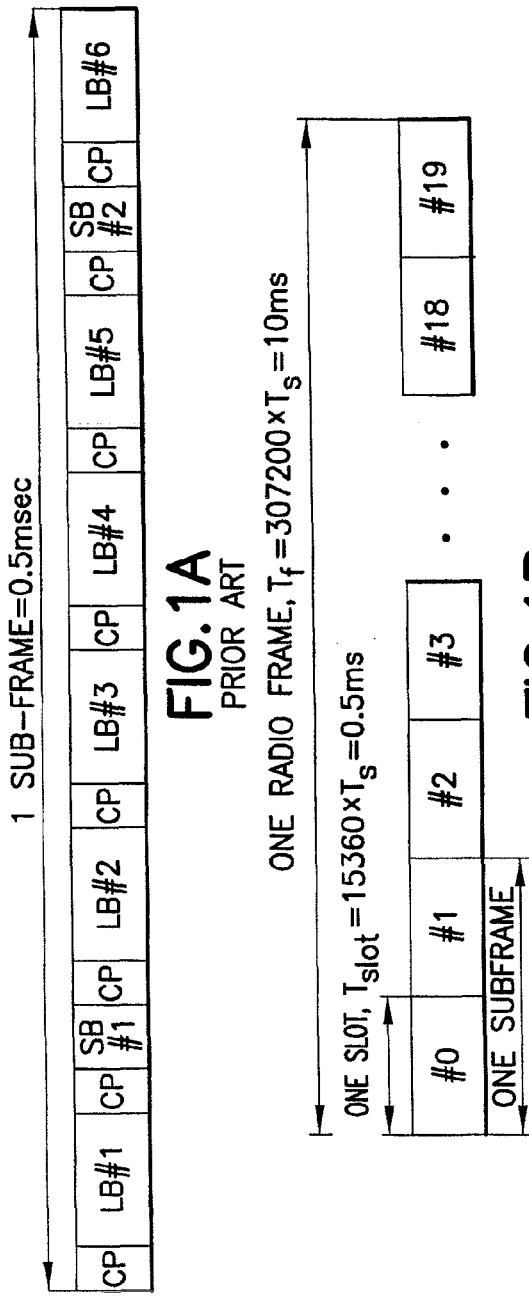
FIG.1A PRIOR ART
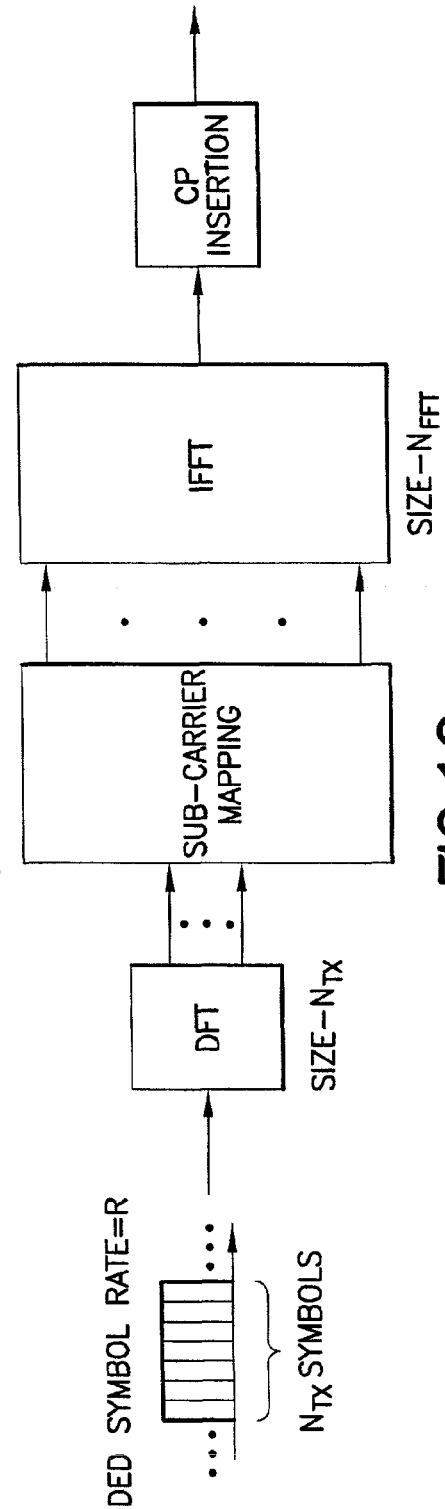
FIG.1B PRIOR ART
FIG.1C PRIOR ART

SLOT#1
CLOCKWISE

SLOT#2
COUNTER CLOCKWISE

| RESOURCE NUMBER | CYCLIC SHIFT SLOT#1 | CYCLIC SHIFT SLOT#2 |
|---|---|---|
| 0 | 0 | 6 |
| 1 | 1 | 11 |
| 2 | 2 | 4 |
| 3 | 3 | 9 |
| 4 | 4 | 2 |
| 5 | 5 | 7 |
| 6 | 6 | 0 |
| 7 | 7 | 5 |
| 8 | 8 | 10 |
| 9 | 9 | 3 |
| 10 | 10 | 8 |
| 11 | 11 | 1 |

| RESOURCE NUMBER | CYCLIC SHIFT SLOT #1 | CYCLIC SHIFT SLOT=2 | | | | | |
|---|---|---|---|---|---|---|---|
| | | SF=2 | SF=3 | SF=4 | SF=5 | SF=6 | SF=7 |
| 0 | 0 | 1 | 1 | 2 | 1 | 3 | 5 |
| 1 | 1 | 0 | 0 | 1 | 3 | 2 | 1 |
| 2 | 2 | – | 2 | 0 | 0 | 1 | 4 |
| 3 | 3 | – | – | 3 | 2 | 0 | 0 |
| 4 | 4 | – | – | – | 4 | 5 | 3 |
| 5 | 5 | – | – | – | – | 4 | 6 |
| 6 | 6 | – | – | – | – | – | 2 |

3rd ACK/NACK RESOURCE(IMPLICIT)

| DATA CYCLIC SHIFT | SLOT#1 BLOCK-LEVEL CODE | | | | SLOT#2 BLOCK-LEVEL CODE | | | |
|---|---|---|---|---|---|---|---|---|
| | 0 | 1 | 2 | 3 | 0 | 1 | 2 | 3 |
| 0 | 0 |   | 12 |   | 15 |   | (3) |   |
| 1 |   | 6 |   |   |   | 11 |   |   |
| 2 | 1 |   | 13 |   | 14 |   | 2 |   |
| 3 |   | 7 |   |   |   | 10 |   |   |
| 4 | 2 |   | 14 |   | 13 |   | 1 |   |
| 5 |   | 8 |   |   |   | 9 |   |   |
| 6 |   | (3) | 15 |   | 12 |   | 0 |   |
| 7 |   | 9 |   |   |   | 8 |   |   |
| 8 | 4 |   | 16 |   | 17 |   | 5 |   |
| 9 |   | 10 |   |   |   | 7 |   |   |
| 10 | 5 |   | 17 |   | 16 |   | 4 |   |
| 11 |   | 11 |   |   |   | 6 |   |   |

| PILOT CYCLIC SHIFT | SLOT#1 BLOCK-LEVEL CODE | | | SLOT#2 BLOCK-LEVEL CODE | | |
|---|---|---|---|---|---|---|
| | 0 | 1 | 2 | 0 | 1 | 2 |
| 0 | 0 |   | 12 |   | (3) | 15 |
| 1 |   | 6 |   | 11 |   |   |
| 2 | 1 |   | 13 |   | 2 | 14 |
| 3 |   | 7 |   | 10 |   |   |
| 4 | 2 |   | 14 |   | 1 | 13 |
| 5 |   | 8 |   | 9 |   |   |
| 6 |   | (3) | 15 |   | 0 | 12 |
| 7 |   | 9 |   | 8 |   |   |
| 8 | 4 |   | 16 |   | 5 | 17 |
| 9 |   | 10 |   | 7 |   |   |
| 10 | 5 |   | 17 |   | 4 | 16 |
| 11 |   | 11 |   | 6 |   |   |

FIG.9

| CELL-SPECIFIC PERMUTATION | TTI INDEX | | | | | | | | | | | |
|---|---|---|---|---|---|---|---|---|---|---|---|---|
| | i | i+1 | i+2 | i+3 | i+4 | i+5 | i+6 | i+7 | i+8 | i+9 | i+10 | i+11 |
| 1 | 0 | 1 | 3 | 6 | 10 | 3 | 9 | 4 | 0 | 9 | 0 | 1 |
| 2 | 1 | 4 | 9 | 4 | 1 | 0 | 1 | 4 | 9 | 4 | 1 | 4 |
| 3 | 2 | 7 | 3 | 2 | 4 | 8 | 4 | 3 | 5 | 10 | 2 | 7 |
| 4 | 3 | 10 | 9 | 11 | 6 | 4 | 7 | 3 | 2 | 5 | 3 | 10 |
| 5 | 4 | 1 | 2 | 8 | 8 | 11 | 9 | 1 | 10 | 11 | 4 | 1 |
| 6 | 5 | 4 | 8 | 6 | 11 | 8 | 1 | 1 | 7 | 6 | 5 | 4 |
| 7 | 6 | 6 | 1 | 2 | 0 | 2 | 2 | 11 | 2 | 0 | 6 | 6 |
| 8 | 7 | 9 | 7 | 0 | 3 | 11 | 6 | 11 | 11 | 7 | 7 | 9 |
| 9 | 8 | 0 | 0 | 9 | 5 | 6 | 8 | 9 | 7 | 1 | 8 | 0 |
| 10 | 9 | 3 | 6 | 6 | 7 | 2 | 11 | 9 | 4 | 8 | 9 | 3 |
| 11 | 10 | 6 | 0 | 4 | 10 | 10 | 2 | 8 | 0 | 2 | 10 | 6 |
| 12 | 11 | 9 | 6 | 2 | 1 | 7 | 6 | 8 | 9 | 9 | 11 | 9 |

| CYCLIC SHIFT RESOURCE | SLOT1 | | | | | | |
|---|---|---|---|---|---|---|---|
| | LB1 | LB2 | LB3 | LB4 | LB5 | LB6 | LB7 |
| 0 | 0 | 0 | 0 | 0 | 0 | 0 | 0 |
| 1 | 1 | 3 | 5 | 7 | 9 | 11 | 6 |
| 2 | 2 | 2 | 2 | 2 | 2 | 2 | 1 |
| 3 | 3 | 5 | 7 | 9 | 11 | 1 | 7 |
| 4 | 4 | 4 | 4 | 4 | 4 | 4 | 2 |
| 5 | 5 | 7 | 9 | 11 | 1 | 3 | 8 |
| 6 | 6 | 6 | 6 | 6 | 6 | 6 | 3 |
| 7 | 7 | 9 | 11 | 1 | 3 | 5 | 9 |
| 8 | 8 | 8 | 8 | 8 | 8 | 8 | 4 |
| 9 | 9 | 11 | 1 | 3 | 5 | 7 | 10 |
| 10 | 10 | 10 | 10 | 10 | 10 | 10 | 5 |
| 11 | 11 | 1 | 3 | 5 | 7 | 9 | 11 |

| CS RESURSSI | PARAMETER A | SLOT1 | | | | |
|---|---|---|---|---|---|---|
| | | $m_{LB}0$ | $m_{LB}1$ | $m_{LB}2$ | $m_{LB}3$ | $m_{LB}4$ |
| 0 | 0 | 0 | 0 | 0 | 0 | 0 |
| 0 | 1 | 1 | 1 | 1 | 1 | 1 |
| 1 | 0 | 6 | 2 | 6 | 10 | 6 |
| 1 | 1 | 7 | 3 | 7 | 11 | 7 |
| 2 | 0 | 4 | 4 | 4 | 4 | 2 |
| 2 | 1 | 5 | 5 | 5 | 5 | 3 |
| 3 | 0 | 10 | 6 | 10 | 2 | 8 |
| 3 | 1 | 11 | 7 | 11 | 3 | 9 |
| 4 | 0 | 2 | 8 | 8 | 8 | 4 |
| 4 | 1 | 3 | 9 | 9 | 9 | 5 |
| 5 | 0 | 8 | 10 | 2 | 6 | 10 |
| 5 | 1 | 9 | 11 | 3 | 7 | 11 |

FIG.15

| CELL: | SLOT1 | | | | | | |
|---|---|---|---|---|---|---|---|
| | LB1 | LB2 | LB3 | LB4 | LB5 | LB6 | LB7 |
| 0 | 1 | 7 | 8 | 9 | 1 | 9 | 4 |
| 1 | 8 | 4 | 3 | 10 | 4 | 8 | 11 |
| 2 | 2 | 9 | 4 | 8 | 7 | 2 | 2 |
| 3 | 4 | 1 | 6 | 2 | 6 | 11 | 0 |
| 4 | 7 | 0 | 2 | 11 | 3 | 5 | 9 |
| 5 | 3 | 11 | 10 | 1 | 9 | 4 | 7 |
| 6 | 6 | 3 | 1 | 5 | 8 | 0 | 10 |
| 7 | 10 | 5 | 7 | 7 | 5 | 7 | 3 |
| 8 | 5 | 8 | 5 | 6 | 0 | 6 | 8 |
| 9 | 9 | 10 | 9 | 4 | 10 | 1 | 6 |
| 10 | 0 | 6 | 0 | 0 | 2 | 10 | 1 |
| 11 | 11 | 2 | 11 | 3 | 11 | 3 | 5 |

FIG.16

COORDINATED CYCLIC SHIFT AND SEQUENCE HOPPING FOR ZADOFF-CHU, MODIFIED ZADOFF-CHU, AND BLOCK-WISE SPREADING SEQUENCES

CLAIM OF PRIORITY

This patent application is a divisional of U.S. patent application Ser. No. 12/150,807 (filed Apr. 30, 2008) and claims benefit thereof under 35 U.S.C. §121, and through Application 12/150,807 also claims priority under 35 U.S.C. 119(e) from Provisional Patent Application Nos. 60/927,054 (filed Apr. 30, 2007) and 60/964,878 (filed Aug. 15, 2007), the disclosure of each being hereby incorporated by reference in their entirety.

TECHNICAL FIELD

The exemplary and non-limiting embodiments of this invention relate generally to wireless communications systems and, more specifically, relate to transmission/reception of ZC (Zadoff Chu) sequences including traditional ZC sequences as well as modified (e.g., extended or truncated) ZC sequences.

BACKGROUND

The following abbreviations are herewith defined:
3GPP third generation partnership project
ACK acknowledgement
CAZAC constant amplitude zero auto-correlation
CDM code division multiplex
CQI channel quality indication
DFT discrete Fourier transform
DM demodulation
e- evolved (also known as LTE for e-UTRAN)
FDM/FDMA frequency division multiplex/multiple access
IFFT inverse fast Fourier transform
LB long block
LTE long term evolution (also known as 3.9G)
NACK negative ACK
Node B base station or BS (including e-Node B)
OFDM orthogonal frequency division mutiplex
PUCCH physical uplink control channel
RAN radio access network
RLC radio link control
RS reference signal
RU resource unit
SIMO single input multiple output
TTI transmission time interval
UE user equipment
UL uplink
UMTS universal mobile telecommunications system
UTRAN UMTS terrestrial radio access network
V-MIMO virtual multiple input/multiple output
ZC Zadoff-Chu Reference can be made to 3GPP TR 25.814, V7.0.0 (2006-06); TECHNICAL SPECIFICATION GROUP RADIO ACCESS NETWORK; PHYSICAL LAYER ASPECTS FOR EVOLVED UNIVERSAL TERRESTRIAL RADIO ACCESS (UTRA) (Release 7), such as generally in section 9.1 for a description of the SC-FDMA UL of e-UTRA. Referring to FIG. 1A, which reproduces FIG. 9.1.1-4 of 3GPP TR 25.814; according to that (former) format there are two blocks reserved for the pilot signal in the 3GPP LTE UL former frame format, referred to as short blocks SB1 and SB2. That format has been recently changed, and FIG. 1B shows a generic format according to current adoption, taken from section 4.1, FIG. 1 of 3GPP TS 36.211 (V1.0.0) (2007-03). It is seen at FIG. 1B that according to the current format, there are no longer SBs but rather the structure is one subframe consisting of two slots, each of length 0.5 msec. The SBs of the older format are replaced by LBs in the newer format. Regardless of the particular format though (FIGS. 1A, 1B or otherwise), in each subframe there will be two pilots (2 pilot LBs in the latest format or more generically two pilot RSs). Additional LBs may also be used for this purpose (e.g., for transmitting out-band or out-time RSs), which may or may not be periodic.

More specifically, as is described in Section 9.1 of 3GPP TR 25.814, the basic uplink transmission scheme is single-carrier transmission (SC-FDMA) with cyclic prefix to achieve uplink inter-user orthogonality and to enable efficient frequency-domain equalization at the receiver side. Frequency-domain generation of the signal, sometimes known as DFT-spread OFDM (DFT S-OFDM), is assumed and illustrated in FIG. 1C, which reproduces FIG. 9.1.1-1 of 3GPP TR 25.814. This approach allows for a relatively high degree of commonality with the downlink OFDM scheme and the same parameters, e.g., clock frequency, can be reused.

The basic sub-frame structure formerly approved for the UL transmission is shown herein in FIG. 1A; two short blocks (SB) and six long blocks (LB) are defined per sub-frame, and two subframes span one TTI. Short blocks are used for reference signals for coherent demodulation and/or control/data transmission. Long blocks are used for control and/or data transmission. As seen at FIG. 1B, there is no longer a distinction as between SBs and LBs but there are still two slots, each to bear one pilot sequence. The data could include either or both of scheduled data transmission and non-scheduled data transmission, and the same sub-frame structure is used for both localized and distributed transmission.

The Zadoff-Chu CAZAC sequence has been agreed upon as the pilot sequence for the LTE UL.

ZC sequences and their modified versions (i.e., truncated and/or extended ZC sequences) are therefore used as reference signals in the LTE uplink system, and will also be used on the physical uplink control channel (PUCCH). It has been decided in 3GPP that data-non-associated control signals such as ACK/NACK and CQI will be transmitted on PUCCH by means of ZC sequences. A paper entitled "MULTIPLEXING OF L1/L2 CONTROL SIGNALS BETWEEN UEs IN THE ABSENCE OF UL DATA" (3GPP TSG RAN WG1 Meeting #47bis, Sorrento, Italy; Jan. 15-19, 2007 by Nokia, document R1-070394) is a reference for those methods. Multiple UEs in a given cell share the same Zadoff-Chu sequence while keeping the orthogonality by using a cyclic shift specific to each UE. In this manner different ones of the UEs in a cell may multiplex their UL transmissions (e.g., non-data associated UL transmissions) on the same frequency and time resource (physical resource block/unit or PRB/PRU; currently 180 kHz in LTE). The orthogonality of the ZC sequences enables the receiving Node B to discern the different signals from one another. However, two problems arise.

First, ZC sequences of different lengths may occasionally have large cross correlation properties. This causes an interference problem for demodulation reference signals.

In order to avoid "code-domain" collisions on PUCCH, different cells/sectors should utilize different ZC mother sequences. This is a problem related to ZC sequences used in PUCCH in that there are not enough proper mother sequences for sufficient randomization, so in some instances adjacent cells operate with the same ZC mother sequence (sometimes termed the base sequence).

Another issue related to PUCCH is that different UEs transmitting data-non-associated control signals in the same cell are separated only by means of different cyclic shifts of the same ZC sequence. The problem with this approach is that the sequences are not perfectly orthogonal against each other.

Orthogonality is Doppler-limited with block-wise spreading performed in the time domain; and Orthogonality is delay-spread-limited when using cyclic shifts of ZC or CAZAC codes within a LB.

It is also noted that orthogonality problems will increase when some practical limitations such as power control errors are taken into account.

FIG. 2 is a schematic diagram showing the available cyclic shifts for a ZC sequence of length 12 symbols. It is noted that orthogonality between different code channels varies widely; the best orthogonality is achieved between the code channels which have the largest difference in cyclic shift domain (e.g., cyclic shift #0 and cyclic shift #6 of FIG. 2) whereas the worst orthogonality is between two adjacent cyclic shifts (e.g., cyclic shift #3 and cyclic shifts #2 and #4 of FIG. 2).

The same issue is related also to the cyclic shifts of block-level spreading codes (see the above-referenced document R1-070394 for further details). Considering an extreme case where the Doppler spread is very high (i.e., due to the UE movement). It is noted that block level codes with adjacent cyclic shifts have the worst cross-correlation properties, and are therefore most difficult to distinguish from one another at the receiver after being multiplexed. Further detail as to addressing such Doppler shifts can be seen at U.S. Provisional Patent Application No. 60/899,861, filed on Feb. 5, 2007; and now PCT/IB2007/004134, filed on Dec. 28, 2007.

Pseudo-random cyclic shift hopping is known in the art, as can be seen at a paper entitled: "CYCLIC SHIFT HOPPING FOR UPLINK SOUNDING REFERENCE SIGNAL" (3GPP TSG RAN WG1 Meeting #48, St. Louis, USA, Feb. 12-16, 2007 by ETRI, document R1-070748).

Another relevant paper is entitled "NON-COHERENT ACK/NACK SIGNALING USING CODE SEQUENCES AS INDICATORS IN E-UTRAN UPLINK" (3GPP TSG RAN WG1 Meeting #47 bis, Sorrento, Italy, Jan. 15-19, 2007 by ETRI, document R1-070078). This paper proposes to use some kind of randomization for ACK/NACK signaling. It assumes that the ACK/NACK signal is transmitted without separate RS such that a certain cyclic shift of CAZAC code corresponds to an ACK and another cyclic shift corresponds to a NACK, respectively. Document R1-070078 appears to propose that mapping of ACK/NACK is done such that a one-to-one mapping relation between the ACK/NACK information and the transmission cyclic shifts in the second block is reversed against the mapping in the first long block LB, and the ACK/NACK information is conveyed in the amount of the cyclic shift.

This is seen to forego what the inventors see as the primary advantage of cyclic shifting: randomizing interference between different code channels when the same underlying mother ZC sequence is used. Where the cyclic shift is given by the ACK/NACK message the UE seeks to send, the orthogonality of the ZC codes cannot be maximized. As will be seen below, the inventors have devised a different approach to address the problem of too few ZC mother codes available to orthogonalize all ZC sequences in use by the various UEs.

SUMMARY

In accordance with one exemplary aspect of the invention is a method that includes quantizing a cyclic shift of a reference signal as a combination of a cell specific cyclic shift with an outcome of a pseudo-random hopping, and broadcasting an indication of the cell specific cyclic shift.

In accordance with another exemplary aspect of the invention is an apparatus that includes a processor and a transmitter. The processor is configured to quantize a cyclic shift of a reference signal as a combination of a cell specific cyclic shift with an outcome of pseudo-random hopping. The transmitter is configured to broadcast an indication of the cell specific cyclic shift.

In accordance with another exemplary aspect of the invention is a computer readable readable memory embodying a program of instructions that are executable by a processor to perform actions directed toward determining a cyclic shift of a reference signal. In this embodiment the actions include quantizing a cyclic shift of a reference signal as a combination of a cell specific cyclic shift with an outcome of a pseudo-random hopping, and broadcasting an indication of the cell specific cyclic shift.

In accordance with another exemplary aspect of the invention is an apparatus that includes processing means (such as for example a digital processor, an ASIC, a FPGA, or the like) and communication means (such as for example a transmitter or transceiver configured to broadcast the cell specific cyclic shift wirelessly). The processing means is for quantizing a cyclic shift of a reference signal as a combination of a cell specific cyclic shift with an outcome of pseudo-random hopping. The communication means is for sending an indication of the cell specific cyclic shift over a wireless link In accordance with another exemplary aspect of the invention is a method that includes determining a cell specific cyclic shift from a received indication of the cell specific cyclic shift, determining a quantized cyclic shift of a reference signal as a combination of the cell specific cyclic shift with an outcome of a pseudo-random hopping, and sending a reference signal that is cyclically shifted according to the determined quantized cyclic shift In accordance with another exemplary aspect of the invention is a computer readable memory embodying a program of instructions that is executable by a processor to perform actions directed toward determining a cyclic shift of a reference signal. In this embodiment the actions include determining a cell specific cyclic shift from a received indication of the cell specific cyclic shift, determining a quantized cyclic shift of a reference signal as a combination of the cell specific cyclic shift with an outcome of a pseudo-random hopping, and sending a reference signal that is cyclically shifted according to the determined quantized cyclic shift.

In accordance with another exemplary aspect of the invention is an apparatus that includes a receiver, a processor and a transmitter. The receiver is configured to receive an indication of a cell specific cyclic shift. The processor is configured to determine from the received indication the cell specific cyclic shift, and also to determine a quantized cyclic shift of a reference signal as a combination of the cell specific cyclic shift with an outcome of a pseudo-random hopping. The transmitter is configured to send a reference signal that is cyclically shifted according to the determined quantized cyclic shift.

In accordance with another exemplary aspect of the invention is an apparatus that includes receiving means (such as for example a receiver or a transceiver), determining means (such as for example a processor, and ASIC or FPGA, or the like), and sending means (such as for example a transmitter or a transceiver). The receiving means is for receiving receive an indication of a cell specific cyclic shift. The determining means is for determining from the received indication the cell specific cyclic shift, and is also for determining a quantized cyclic shift of a reference signal as a combination of the cell specific cyclic shift with an outcome of a pseudo-random hopping. The sending means is for sending a reference signal that is cyclically shifted according to the determined quantized cyclic shift.

BRIEF DESCRIPTION OF THE DRAWINGS

Embodiments of the invention are detailed below with particular reference to the attached drawing Figures.

FIG. 1A reproduces FIG. 9.1.1-4 of 3GPP TR 25.814 (V7.0.0), showing an earlier sub-frame format for the 3GPP LTE UL.

FIG. 1B reproduces FIG. 1 at section 4.1 of 3GPP TR 36.211 (V1.0.0), showing a recently-adopted sub-frame format (generic) for the 3GPP LTE UL.

FIG. 1C reproduces FIG. 9.1.1-1 of 3GPP TR 25.814, and shows frequency domain generation of the transmitted signal for the 3GPP LTE SC-FDMA UL.

FIG. 9 is a tabular format of combined CAZAC sequence cyclic shift hopping and block-wise spreading sequence cyclic shift hopping for the ACKs/NACKs sent according to FIG. 8.

FIG. 15 is a tabular format of a symbol-wise hopping pattern component randomizing for intra-cell interference for twelve cyclic shifts of CAZAC sequence that repeats over one radio frame slot (seven long blocks) when 6 UEs are multiplexed by CAZAC sequence cyclic shifts.

FIG. 16 is a tabular format of a symbol-wise hopping pattern component randomizing for inter-cell interference for twelve cyclic shifts of CAZAC sequence that repeats over one radio frame slot (seven long blocks).

DETAILED DESCRIPTION

Embodiments of this invention concern ZC cyclic shift hopping. The goal of the shift hopping in certain embodiments is to provide improved cross-correlation and interference averaging properties between the ZC sequences transmitted by multiple UEs. Embodiments of this invention present a coordinated cyclic shift hopping scheme that is applicable for both demodulation RS and PUCCH. In broad terms, an exemplary code hopping scheme presented herein can be divided into two distinct aspects: randomization inside a TTI and randomization outside the TTI. A particularly advantageous environment for this invention is the UL in a UTRAN LTE system, though that itself is not a limitation to this invention since the sequence hopping techniques detailed herein may be used in any wireless system such as GSM (global system for mobile communication), HSDPA (high-speed data packet access), or any other system that might employ shifted CAZAC sequences/reference signals from a limited number of mother/base codes. Further, the invention is not limited to only ZC codes but to any CAZAC sequence, and the ZC codes detailed herein include modified (e.g., extended or truncated) ZC codes as well. As will be seen, both transmission and reception of such ZC sequences are detailed.

Figure 2:
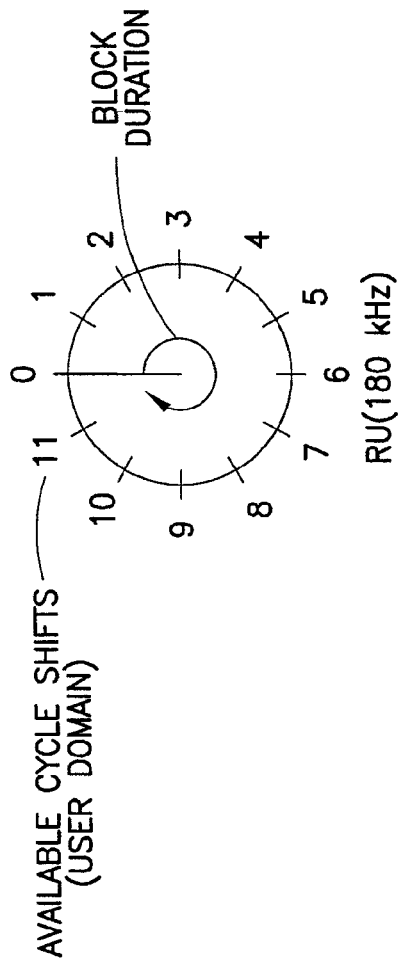
FIG. 2 is a schematic diagram illustrating all available cyclic shifts of CAZAC sequence over a single resource unit, arranged as a clock to show adjacent shift with poor orthogonality and opposed shifts with good orthogonality.
Figure 3:
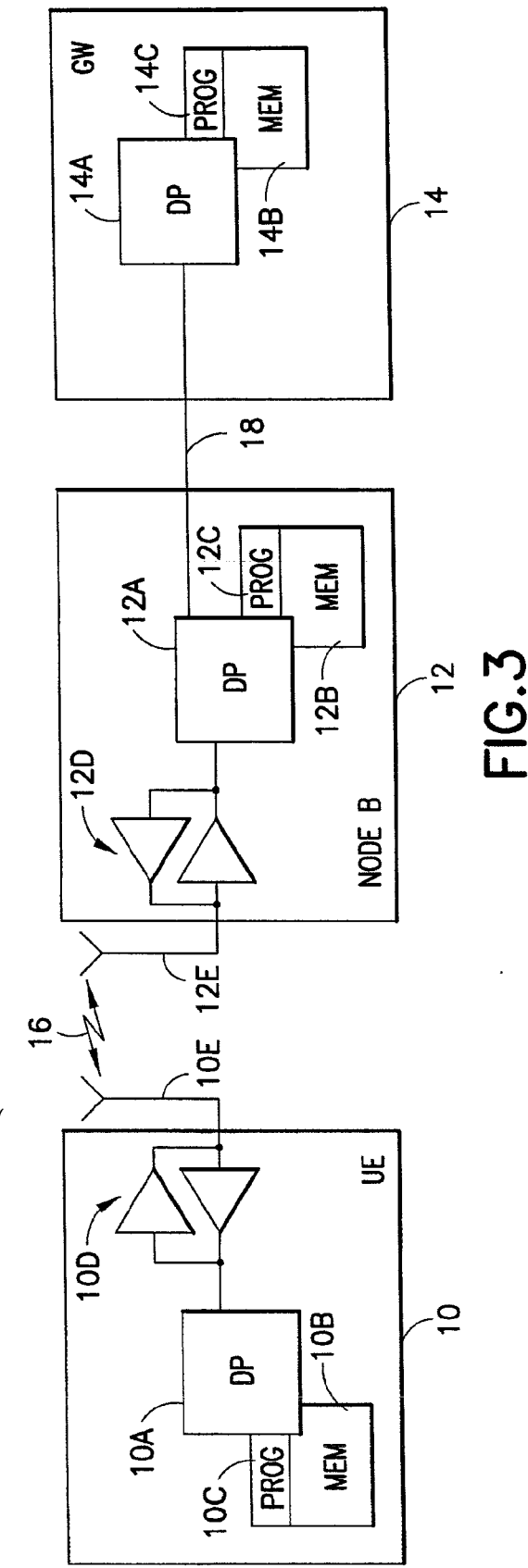
FIG. 3 shows a simplified block diagram of various electronic devices that are suitable for use in practicing the exemplary embodiments of this invention.

Reference is made first to FIG. 3 for illustrating a simplified block diagram of various electronic devices that are suitable for use in practicing the exemplary embodiments of this invention. In FIG. 3 a wireless network 1 is adapted for communication with a UE 10 via a Node B (base station) 12. The network 1 may include a serving gateway GW 14, or other radio controller function. The UE 10 includes a data processor (DP) 10A, a memory (MEM) 10B that stores a program (PROG) 10C, and a suitable radio frequency (RF) transceiver 10D for bidirectional wireless communications over a link 16 via one or more antennas 10E with the Node B 12, which also includes a DP 12A, a MEM 12B that stores a PROG 12C, and a suitable RF transceiver 12D and antenna 12E. The Node B 12 may communicate via a data path 18 (e.g., Iub) to the serving or other GW 14, which itself includes a DR 14A coupled to a MEM 14B storing a PROG 14C. The GW 14 may then communicate via another data interface to a core network (not shown) as well as to other GWs. At least one of the PROGs 10C, 12C and 14C is assumed to include program instructions that, when executed by the associated DP, enable the electronic device to operate in accordance with the exemplary embodiments of this invention, as will be discussed below in greater detail. In general, the exemplary embodiments of this invention may be implemented by computer software executable by the DP 10A of the UE 10 and the other DPs, or by hardware, or by a combination of software and/or firmware and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figures 10, 11:
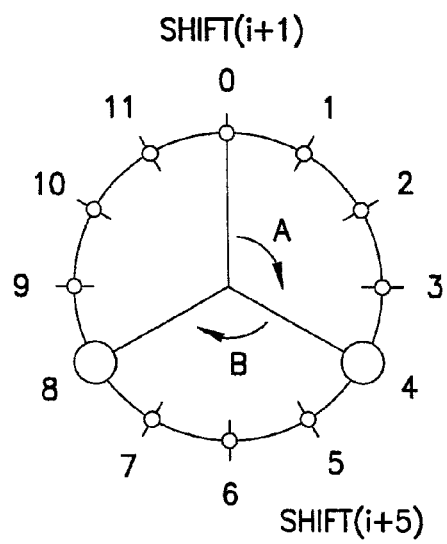
FIG. 10 is a tabular format of an inter-TTI cyclic shift hopping pattern for twelve reference signals that repeats over one radio frame (ten transmission time intervals).
FIG. 11 is similar to FIG. 4A but showing the combined cyclic shift pattern for combined intra-TTI and inter-TTI shift hopping.
Figure 12:
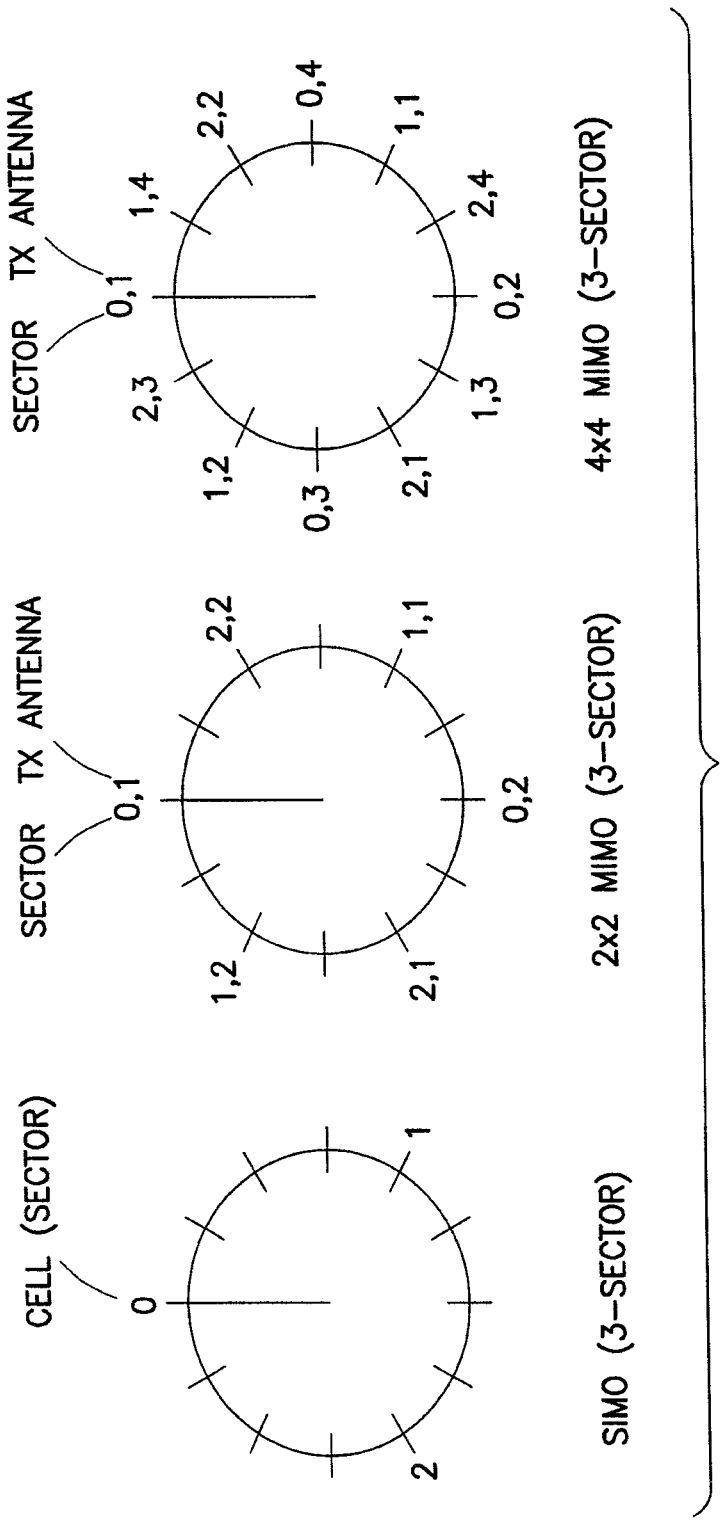
FIG. 12 is similar to FIG. 4A illustrating cyclic shift patterns for each of three different SIMO/MIMO environments.

As noted above, it is convenient for this description to parse the invention into two components: randomization inside a TTI and randomization outside a TTI. FIGS. 4-9 detail randomization inside a TTI for different scenarios, and FIG. 10 details randomization outside a TTI. FIG. 11 combines the above two aspects to show total cyclic shift for a certain ZC sequence taking into account both intra-TTI shifts and inter-TTI shifts to arrive at the final shift of the sequence. A shifted ZC is alternatively termed the reference signal. FIG. 12 shows the principle extended to a virtual MIMO scenario.

Figures 4A, 4B, 5:
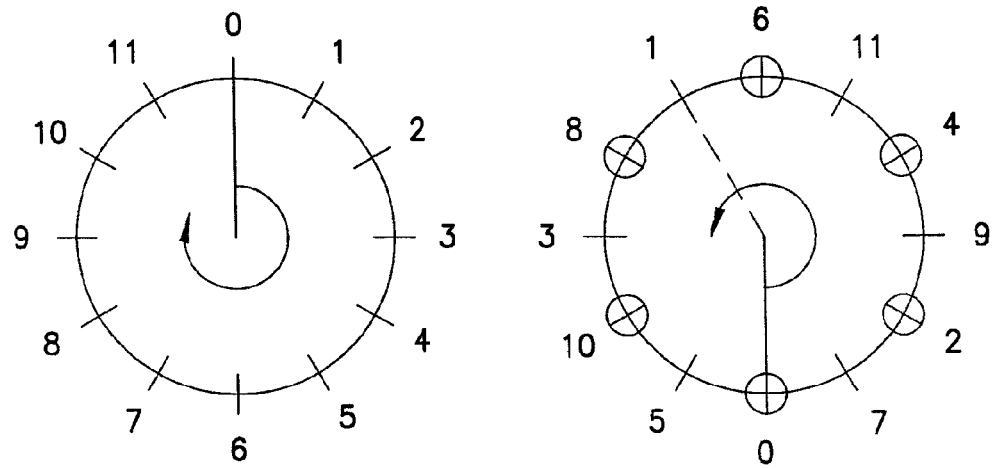
FIGS. 4A-B are each similar to FIG. 2 and showing different CAZAC sequence cyclic shift hopping patterns for use in different slots within any given transmission time interval.
FIG. 5 is a table showing the combined data of FIGS. 4A-B in tabular format as may be stored in a network or portable wireless device.

As will be detailed below, the specific example of FIGS. 4A-B and 5 shows the cyclic shift hopping principle for DM RS of minimum length (12 symbols). In fact, the DM RS length depends on the allocated bandwidth, which is a multiple of RUs. In LTE, the RUs are each 12 frequency pins. It follows then that the allowed cyclic shifts can be quantized according to the RS length of the minimum bandwidth allocation. For LTE with 12 frequency pins per RU, this means that there are always only 12 possible cyclic shift values for CAZAC sequence, regardless of the RS bandwidth. The possible cyclic shift values (cyclic_shift_value) are then [0, 1, .. . 11]. Assuming a generation of the cyclic shifts so that cyclic shifts in time results, the actual cyclic shift in symbols is calculated as follows:

$$\text{Cyclic\_shift\_symbols} = \frac{\text{cyclic\_shift\_value} \times \text{RS\_length}}{12}. \quad [\text{Eq. 1}]$$

It is noted that quantization of the cyclic shift space is clearly beneficial from the signaling point of view. With large bandwidths, sequences which have a smaller cyclic shift difference than Cyclic_shift_symbols calculated by Equation 1 will generally not have sufficient cross-correlation properties.

First is detailed randomization inside a TTI for the environment of CAZAC sequence cyclic shifts, described with reference to FIGS. 4A-B and 5 using all 12 possible cyclic shifts. Randomization inside a TTI is realized by means of pre-defined shift hopping pattern. There are two slots in each TTI (Slot #1 and Slot #2; FIG. 1A shows a subframe or a single slot of a TTI and FIG. 1B shows two slots within a single subframe). FIG. 4A-B shows one embodiment of the shift-hopping principle. FIG. 4A shows the shift hopping (allocation) pattern for the first slot, and FIG. 4B shows the shift hopping (allocation) pattern for the second slot. The driving criterion is to maximize the cyclic shift separation with respect to the adjacent cyclic shifts within the TTI. This is seen at FIG. 4B; adjacent shifts (e.g., #6 and #4 are adjacent to #11) are well separated from their adjacent shift in that second slot. Another criterion is to maximize the cyclic shift rotation between the 1st and the 2nd slot (the shift as between the same 'clock' position/TTI of FIGS. 4A and 4B). FIG. 4A shows this as a clockwise rotation between the adjacent resources whereas with the randomized shifts illustrated in FIG. 4B this shown as a counterclockwise rotation between the adjacent resources. The shift hopping pattern of FIGS. 4A-B is shown in numerical format in the table of FIG. 5. Each 'clock' position of FIGS. 4A-B corresponds to one row ('resource number' or RU) of FIG. 5, and each row informs the shift for one resource of one TTI. For example, at resource number 4 of FIG. 5, the ZC sequence in slot #1 is shifted to shift position 4 and the ZC sequence in slot #2 of that same TTI is shifted to shift position 2, which are well spaced from one another as can be seen at FIG. 4A.

Additionally, to avoid interference among adjacent cells, a cell-specific constant rotation for the cyclic shifts of slot #2 (with respect to the original hopping pattern of FIG. 5) may be imposed in order to guarantee that the shift rotation from the 1st slot to the 2nd slot is not the same between different (adjacent) cells. This can be illustrated as follows:

$$\text{Cyclic\_sft\_slot2(cell)} = \text{mod}(\text{Cyclic\_sft\_slot2} + \text{increment(cell)}, \text{Num\_Shifts}) \quad [\text{Eq. 2}]$$

where "Num_Shifts" is the total number of allowed cyclic shifts (e.g., 12 in this example), and mod is a modulo operation (modulus after division). The cell-specific parameter "increment" varies between [0, 1, . . . (Num_Shifts−1)]. This randomizes the shift among adjacent cells, to preempt the situation where adjacent cells shift from the same base ZC sequence.

It is noted that if the cyclic shifts are calculated in the time domain after the inverse fast Fourier transform IFFT block of FIG. 1B, then Eq. 2 as written is not valid; in that instance IFFT oversampling should be taken into account.

Figures 6, 7:
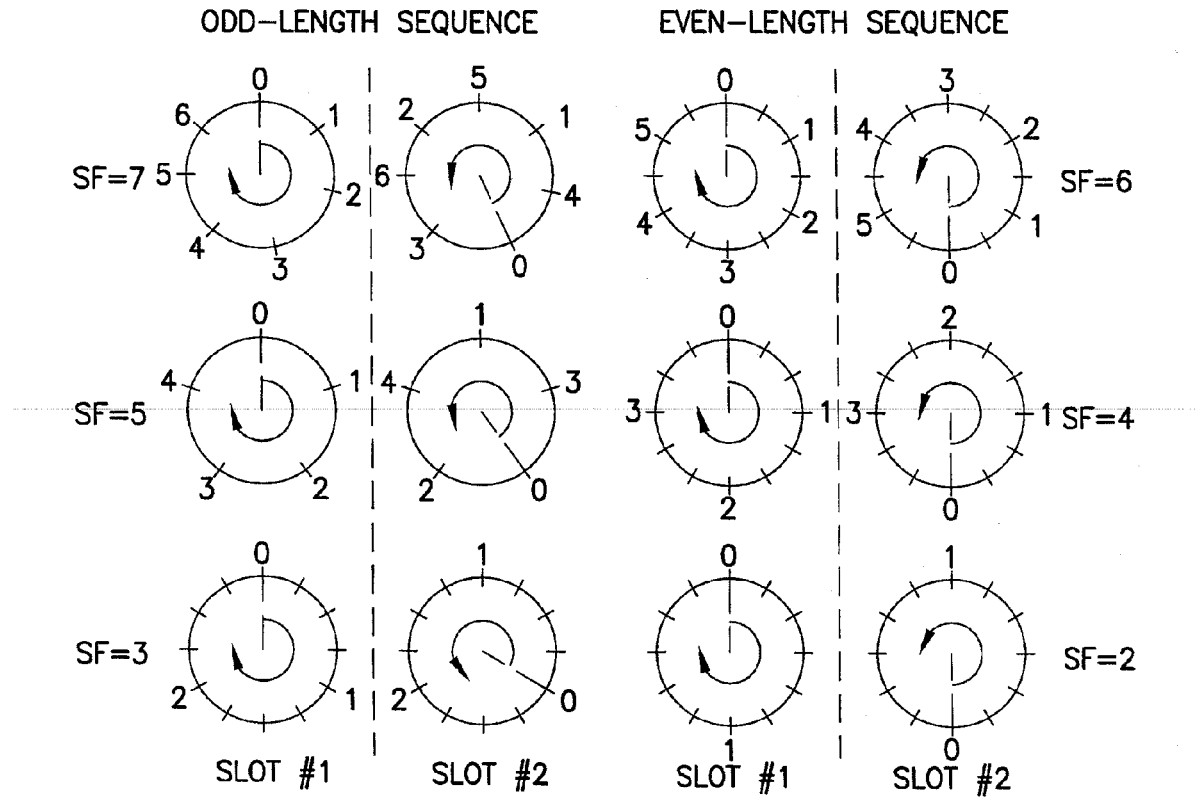
FIG. 6 is similar to FIGS. 4A-B showing, for different spreading factors, different block level cyclic shift hopping patterns.
FIG. 7 is a table showing the data of FIG. 6 in tabular format as may be stored in a network or portable wireless device.

Continuing with an exemplary intra-TTI cyclic shift aspect of the invention, now is described with reference to FIGS. 6-7 an example for block level spreading. Randomization for block-level spreading codes (ZC sequences and their modified versions) inside a TTI is achieved again by means of a pre-defined cyclic shift hopping pattern. In this case though, the ZC sequence length used in the block level spreading application depends on the spreading factor. An exemplary cyclic shift hopping pattern is shown at FIG. 6 in 'clock' pairs for spreading factors SFs two through seven, and the same data is shown numerically in the table of FIG. 7. As with the CAZAC sequence example above, note that for each SF the cyclic shift separation is maximized with respect to adjacent cyclic shifts in slot #2, and that the cyclic shift rotation is maximized between the first and second slots. Different columns are shown in FIG. 6 for even versus odd SFs. The SF equals the number of long blocks in the subframe (see FIG. 1A).

It should be noted that the hopping pattern shown at FIG. 7 can be applied also for other block-wise spreading sequences that ZC or CAZAC sequences. In particular, hopping pattern with SF=4 is optimal for randomizing Doppler induced interference between Walsh-Hadamard sequences defined by Hadamard matrices.

Similar to that noted above in the CAZAC sequence example, it follows that an additional cell-specific constant rotation may be imposed for the cyclic shifts of slot #2 (with respect to the original hopping pattern shown in FIG. 7), according to Equation 2 above and for the same reason; to forego cross-correlation among adjacent cells shifting the same base ZC sequence.

Figure 8:
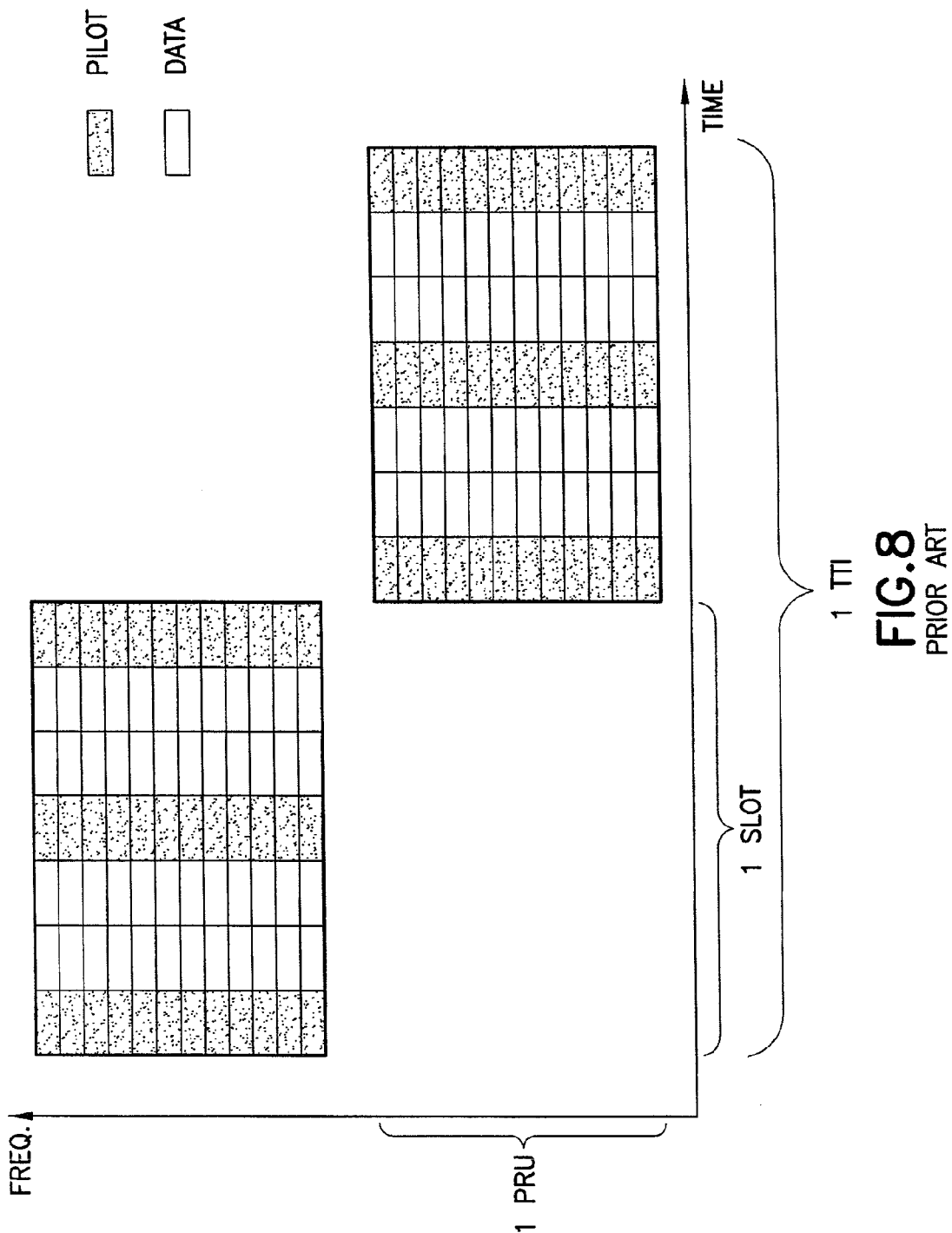
FIG. 8 is a prior art diagram of a transmission format for ACK/NACK signaling in UTRAN-LTE.

Now is described a specific implementation for intra-TTI cyclic shifts of ZC sequences in an ACK/NACK transmission that randomizes those sequences. The transmission format of ACK/NACK signaling on the PUCCH was agreed at the RAN1 #48 bis meeting in Malta. FIG. 8 illustrates that agreed upon format. There are three blocks reserved for pilot signals (darkened blocks) and four blocks reserved for data (the lighter blocks, which is where the ACK/NACK signal lies). Two consecutive slots (0.5 msec) equal one TTI (1.0 msec), and each physical resource unit PRU has twelve RUs identified in the table of FIG. 9 by the index 'cyclic shift'.

According to an embodiment of the invention, both ZC sequences (the CAZAC sequence in a symbol such as at FIG. 5 and the block level ZC spreading sequence such as at FIG. 7) apply the proposed shift hopping principles separately. A cyclic shift randomization example using a specific cyclic shift according to an embodiment of the invention is shown in FIG. 9. As seen there, the rotation in slot #1 for both data and pilots is identical to one another. However, the cyclic shift differs markedly once in slot #2 so as to randomize any cross correlation. In each of the slots for data or pilots, there are eighteen ACK/NACK resources in use in FIG. 9 as evidenced by the darkened blocks reciting a shift number.

Now is described by example the other distinct aspect of the invention noted above, randomization as between different TTIs or inter-TTI randomization. Randomization outside one TTI is achieved by means of cell specific cyclic shift patterns. An important aspect of this inter-TTI randomization is to provide uncorrelated "ZC-to-ZC" cross-correlation properties from TTI to TTI.

A randomization pattern is generated according to the minimum DM reference signal length, which continuing with the example above is 12 symbols. There are then 12 orthogonal shift hopping patterns with 12 cyclic shifts. This means that a reuse pattern of 1/12 is possible.

FIG. 10 shows an example of the cell-specific cyclic shift permutation matrix for the CAZAC sequence. The pattern is periodic and it's length equals to the length of one radio frame, in this instance 10 ms or equivalently 10 TTIs. The permutation matrix has been generated in such a way that all the possible cyclic shift changes (i.e., 0, 1, . . . 11) take place in all 12 cells of the reuse pattern when the TTI index changes.

Randomization outside the TTI may also be imposed for the block-spreading codes following the teachings above for intra-TTI block spreading. As with the intra-TTI cyclic spreading, a pseudo-random hopping pattern (permutation matrix) for those codes would be generated separately and used separately or combined (as the wireless protocol may allow) with the CAZAC sequence cyclic shifts similar to that done at FIG. 9 when combining the intra-TTI cyclic shifts. Alternatively and for inter-TTI randomization only, the same randomization matrix (e.g., that of FIG. 10 or similar) may be used for both CAZAC sequence cyclic shifts and block level cyclic shifts.

Now that both intra-TTI cyclic shifts and inter-TTI cyclic shifts have been detailed with respect to both CAZAC sequences and block spreading codes, the combined cyclic shift hopping is derived from the component shifts. The net cyclic shift of the ZC sequence that is ultimately transmitted is simply the total cyclic shift for the given slot, which is obtained as a combination of resource or cell specific cyclic shift (slot #1, slot #2) combined with an outcome of cell-specific pseudo-random hopping. In a specific example, when the value of a cell-specific permutation matrix equals to 4 (rotation shift A of FIG. 11 moving from 0 to 4) and the resource-specific cyclic shift is 4 (rotation shift B of FIG. 11 moving from 4 to 8), then the actual cyclic shift for slot #1 is the combined result, or eight in FIG. 11. The combined rotation for slot #2 will similarly be a combination of the cell-specific permutation matrix for the second slot (the intra-TTI shift) with the resource-specific cyclic shift for that second slot (the inter-TTI shift).

The total cyclic shift value for a certain slot of a TTI taking into account both intra-TTI and inter-TTI randomization can be illustrated as $$\text{Cyclic\_sft\_value} = \text{mod}(\text{Cyclic\_hop\_intra}(\text{cell/resource,slot}) + \text{Cyclic\_hop\_inter}(\text{cell},i), \text{Num\_Shifts}) \quad [\text{Eq. 3}]$$

where i is the TTI index, Cyclic_hop_intra is the cyclic shift hopping pattern for intra-TTI hopping (e.g., FIGS. 5 and/or 7), Cyclic_hop_inter is the cyclic shift hopping pattern for inter TTI hopping (e.g., FIG. 10), Num_Shifts is the total number of allowed cyclic shifts (e.g., 12 in the example), and mod is a modulo operation (modulus after division). It is noted that cyclic shift allocation Cyclic_hop inner (cell/resource, slot) can be configured to be cell-specific (e.g., DM RS) or resource specific (e.g., ACK/NACK using implicit signaling).

It was agreed at the RANI #49 bis meeting that a symbol-wise cyclic shift hopping is applied on PUCCH. Cyclic shift hopping for each symbol on the PUCCH is discussed, particularly at section 4, in a paper entitled CYCLIC SHIFT HOPPING OF UL ACK CHANNELS (3GPP TSG RAN WG1 Meeting #49 bis, Orlando, USA 25-29 Jun. 2007 by Samsung, document R1-073149). The previously described cyclic shift hopping can be applied also with symbol-rate cyclic shift hopping, allowing for clearly structured hopping patterns over multiple TTIs. Two cases are considered:

A symbol-wise hopping pattern is defined with a duration of a slot. Then the Cyclic_sft_value in Eq. 3 is used as an index referencing to a cyclic shift resource of a CAZAC sequence. This index is used in the definition of cyclic shift hopping pattern for the slot. For example, Cyclic_sft_value can provide cyclic shift value for the $1^{st}$ long block LB.

A symbol-wise hopping pattern is defined with a duration of a TTI. Then the Cyclic_hop_inter for inter-TTI hopping is used as an index referencing to a cyclic shift resource of a CAZAC sequence. This index is used in the definition of cyclic shift hopping pattern for the TTI. For example, Cyclic_sft_value can provide cyclic shift value for the $1^{st}$ LB.

Other variations are possible, but since the above description provides an inter-TTI shift pattern, an intra-TTI shift pattern, and a total shift pattern, any one of those patterns can be used as an index referencing to a cyclic shift resource for a symbol-wise hopping pattern in the slots of a TTI and among different TTIs.

Now symbol-wise cyclic shift hopping patterns with a duration of a slot are defined. These patterns are composed of two components, with the other providing intra-cell interference randomisation and the other providing inter-cell randomisation. Starting from the hopping pattern component randomizing intra-cell interference, the main criterion on the hopping pattern design is to minimize the occurrence, or the number of LBs, within a TTI when a particular pair of UEs uses neighbouring cyclic shifts. Only the pairs between UEs using the same block-wise spreading code are considered in the criterion, since the transmissions from UEs using different block-wise spreading codes are mutually orthogonal at low or moderate UE speeds.

Figures 13, 14:
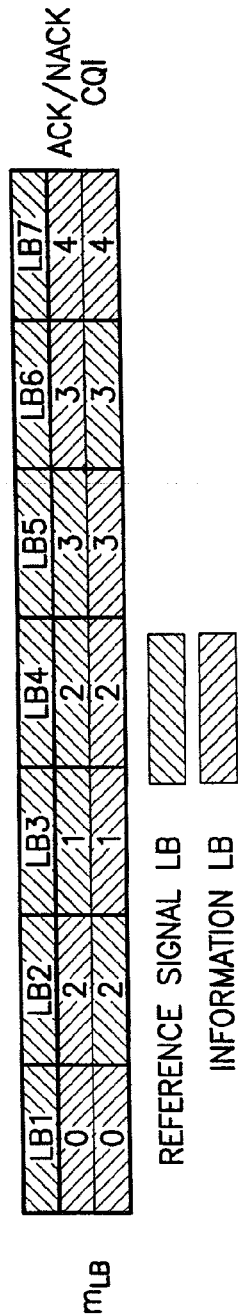
FIG. 13 is a tabular format of a symbol-wise hopping pattern component randomizing for intra-cell interference for twelve cyclic shifts of CAZAC sequence that repeats over one radio frame slot (seven long blocks) when 12 UEs are multiplexed by CAZAC sequence cyclic shifts.
FIG. 14 shows mapping between the LB number in a slot and the columns of symbol-wise hopping pattern.

Two different multiplexing scenarios are considered with intra-cell interference randomization: when either 12 or 6 UEs are multiplexed by CAZAC sequence cyclic shifts within a LB (Cyclic_shift_symbols in Eq. 1). When 12 UEs are multiplexed by CAZAC sequence cyclic shifts, all 12 cyclic shifts can be used by UEs having the same block-wise spreading code. Hence the design of hopping pattern is focused on randomization of interference between even and odd cyclic shifts in particular. FIG. 13 shows one cyclic shift hopping pattern according the design criterion. The multiplexing scenario of 12 UEs by CAZAC sequence cyclic shifts may be used on the transmission of scheduling requests, in which case the intra-cell interference randomization by symbol-wise cyclic shift hopping becomes crucial.

6 UEs can be multiplexed by CAZAC sequence cyclic shifts in the case of CQI, ACK/NACK, or scheduling request transmission. In this scenario, different UEs having the same block-wise spreading code are separated by two cyclic shifts. Hence the design of hopping pattern is focused on randomization of interference among the even cyclic shifts as well as among the odd cyclic shifts, and only little attention is paid to the randomization between even and odd cyclic shifts. Another aspect of this scenario is that some of the LBs are used for reference signal (2 or 3 in the case of CQI or ACK/NACK, respectively) while others are used to carry information (4 or 5 in the case of ACK/NACK or CQI, respectively). As a result, the cyclic shift hopping pattern does not need to have length of subframe and the length corresponding to the maximum number of either information or reference LBs is sufficient. To obtain the period of a subframe, some of the columns of the hopping pattern are repeated during the subframe. However, they are repeated so that the same columns are not repeated during the transmission of information LBs or during the transmission of reference symbols. One such mapping between hopping pattern columns and LB number in a slot is shown in FIG. 14. It should be noted that such mapping allows for multiplexing of CQI and ACK/NACK transmissions from different UEs into one RU. FIG. 15 shows one cyclic shift hopping pattern according the presented design criterion Continuing with the component of symbol-wise hopping pattern randomizing inter-cell interference, the same principles as with inter-TTI randomization are applied. Randomization is achieved by means of cell specific cyclic shift patterns, and a randomization pattern is generated according to the sequence length within a LB, which continuing with the example above is 12 symbols. There are then 12 orthogonal shift hopping patterns with 12 cyclic shifts, meaning that a reuse pattern of 1/12 is possible.

FIG. 16 shows an example of the cell-specific cyclic shift permutation matrix for the CAZAC sequence. The pattern is periodic and its length equals to the length of one slot, in this instance 0.5 ms or equivalently 7 LBs. The permutation matrix has been generated in such a way that all the possible cyclic shift changes (i.e., 0, 1, . . . 11) take place in all 12 cells of the reuse pattern when the TTI index changes.

The cyclic shift value for a certain LB taking into account intra-TTI and inter-TTI randomization as well as symbol-wise hopping can be illustrated as Cyclic_Shift=mod(Symbol_hop_infra(Cyclic_sft_value,m,c)+Symbol_hop_inter(cell,k), Num_Shifts) [Eq. 4]

where Symbol_hop_intra is the component of symbol-wise hopping randomizing intra-cell interference (e.g. FIG. 13 or 14), Cyclic_sft_value is the value given by Eq. 3, k is the LB index, m is the index mapping k index to hopping pattern columns, c is the parameter related to the resource allocation or block-wise spreading code and the transmission content, Symbol_hop_inter is the component of symbol-wise hopping randomizing inter-cell interference (e.g. FIG. 16), Num_Shifts is the total number of allowed cyclic shifts (e.g., 12 in the example), and mod is a modulo operation (modulus after division).

Implementation of the shift hopping patterns can be based on a lookup table located/stored in a MEM of the UE 10 and of the Node B 12. Separate lookup tables may be used for randomization inside the TTI and randomization outside the TTI as well as for the intra-cell and inter-cell interference randomisation components of symbol-wise cyclic shift hopping in the manner described above.

An alternative to the stored lookup tables is to implement the functionality by means of simple equations, which may be implemented as software, firmware (integrated circuitry), or a combination. For example, FIG. 5 can be implemented as the equations:

Cyclic_sft_slot2=mod(6−Cyclic_sft_slot1, 12), for even values of "Cyclic_sft_slot1"; and by
Cyclic_sft_slot2=mod(−Cyclic_sft_slot1, 12), for odd values of "Cyclic_sft_slot1"; where N is the length of the sequence (in symbols).

Similarly, FIG. 7 can be implemented as the equations:
Cyclic_sft_slot2=mod(1—Cyclic_sft_slot1, N), for even values of N;
Cyclic_sft_slot2=mod(1+2*Cyclic_sft_slot1, N), for N=3;
Cyclic_sft_slot2=mod(−2+3*Cyclic_sft_slot1, N), for N=5; and
Cyclic_sft_slot2=mod(2*Cyclic_sft_slot1+1, N), for N=7.

Intra-cell interference randomization hopping component in the scenario of 12 UEs multiplexed can be implemented as the equations:

Symbol_hop_intra=mod(Cyclic_sft_value−⌊$k_{LB}$/7⌋Cyclic_sft_value/2,12), for even values of "Cyclic_sft_value" given by Eq. 3;

$$\text{Symbol\_hop\_intra} = \text{mod}\left( \begin{array}{c} \text{Cyclic\_sft\_value} + 2(k_{LB} - 1) - \\ \lfloor k_{LB}/7 \rfloor \left( \dfrac{\text{Cyclic\_sft\_value} + 1}{2} - 6 \right) \end{array}, 12 \right),$$

for odd values of "Cyclic_sft_value", where $k_{LB}$=1, 2, . . . , 7 is the index of LB in the slot.

Intra-cell interference randomization hopping component in the scenario of 6 UEs multiplexed can be implemented as the equations:

Symbol_hop_intra=mod(2$cs_{index}$−⌊$m_{LB}$/4⌋$cs_{index}$−2 ($cs_{index}$,3))(1−⌈$m_{LB}$/4⌈)+c,12), for even values of "Cyclic_sft_value" given by Eq. 3;

Symbol_hop_intra=mod(2$cs_{index}$+4($m_{LB}$−1)−⌊$m_{LB}$/4⌋ ($cs_{index}$−5)−(4+3/2($cs_{index}$−mod($cs_{index}$,4)))(1−⌈$m_{LB}$/4⌈)+c,12), for odd values of "Cyclic_sft_value", where $cs_{index}$=⌊Cyclic_sft_value/2⌋thus ranging 0, 1, . . . 5, $m_{LB}$ is as shown in FIG. 14, ⌈x⌉ is the smallest integer larger than or equal to x, ⌊x⌋ is the largest integer smaller than or equal to x, parameter c can have values 0 or 1. The value for parameter c may be obtained as a remainder of Cyclic_sft_value/2 or derived from the block spreading sequence index. It may be also a constant, a cell specific parameter, or an UE may use both values as in the case of CQI transmission utilizing two adjacent cyclic shifts.

These equations, as well as [Eq. 1], [Eq. 2], [Eq. 3], and [Eq. 4] above, may be embodied in software and executed by a digital signal processor such as the DP 10A, 12A, 14A, or by firmware/circuitry of an integrated circuit, or by some combination thereof.

The invention as detailed above by example offers multiple advantages over the cyclic shift regimens known in the art. Specifically:

Even-length patterns (randomization inside the TTI):
  Cyclic shifts n and mod(n+N/2,N) have always the smallest cross-correlation: maintaining this property during the randomization is beneficial in many applications.
    DM RS: It is always possible to provide the smallest possible cross-correlation between the UEs paired to operate in V-MIMO.
    Control channel application: It is possible to transmit ACK/NACK by means of RS (one cyclic shift corresponds to ACK and another cyclic shift NACK). Always the smallest possible cross-correlation between ACK/NACK.
    Block spreading application: Partial orthogonality properties are maximized (better Doppler protection). It is possible to maintain the orthogonality between the code channels also with very high UE speeds (e.g., 360 km/h) at the expense of multiplexing capacity.
  Maximum cyclic shift rotation between the 1st and the 2nd slot.
  Maximum cyclic shift separation with respect to adjacent cyclic shifts (between the $1^{st}$ and $2^{nd}$ slot).
For odd-length patterns (randomization inside TTI):
  Maximum cyclic shift rotation between the 1st and the 2nd slot.
  Maximum cyclic shift separation with respect to adjacent cyclic shifts (between the $1^{st}$ and $2^{nd}$ slot).
  Straightforward signalling.
  Support for implicit signalling.

In a particular embodiment, the cyclic shift hopping is not fully configurable by the network/Node B (e.g., not on every allocation table AT/physical downlink control channel PDCCH it sends). The inventors deem the required signaling as overly burdensome if the used cyclic shifts need to be signaled in every UL/DL allocation grant (i.e, 12 cyclic shifts+2 slots requires at least 5 bits from the allocation grant signaling, a large signaling overhead commitment). Where the network/Node B cannot configure the cyclic shifts fully, radio link control RLC signaling and/or a sector specific broadcast channel provides the UEs with the relevant cyclic shift hopping sequences in current use, such as upon entry or re-entry of the UE into a cell.

It is noted that DM RS allocation in a V-MIMO application is a special case from the cyclic shift allocation point of view (compared to the SIMO case). Basically, in V-MIMO we need multiple cyclic shift resources per cell whereas in the SIMO case we need only a single cyclic shift per cell. Therefore, The SIMO case can rely on semi-static signaling: Cyclic shift allocation can be made cell or resource specific.
In the V-MIMO case using only signaling, UEs should be put into 2 pre-determined groups corresponding to a pre-defined cyclic shift allocations (see for example FIGS. 4A-B). One concern with this approach is that the grouping will introduce some scheduler limitations on the network/Node B: it is not possible to schedule two UEs being allocated into the same cyclic shift group without collision of the RSs. This will reduce the potential gain of V-MIMO, though it is context-dependent as to whether the reduction would be significant or negligible.

Thereby, in the MIMO case it is advantageous to also use UE-specific signaling for the cyclic shifts. This information can be transmitted with UL resource allocation grant signaling (e.g., in an allocation table AT, also known as a packet data control channel PDCCH). That signaling would be used to signal the actual cyclic shift allocated for the particular UE in case of MIMO, such as a separate field with entries associated with each of the UEs being allocated or entries associated with only those UEs whose cyclic shift pattern is to be changed on the allocated resources as compared to its previous UL data transmission.

As an exemplary embodiment of this UE specific signaling with the UL resource allocation, the UE-specific information would include:
  0 extra bits required in SIMO case;
  1 extra bit required in 2×2 MIMO case (which one of the two resources is allocated to the given UE);
  2 extra bits required in 4×4 MIMO case; and
  3 extra bits required in MIMO case supporting more than 4 antennas.

For convenience, we term these extra bits in the UL allocation grant message as a "MIMO cyclic shift indicator".

The MIMO-related cyclic shift signaling can be realized in two ways.
a) Reserve always 1 or 2 bit extra signaling space ("MIMO cyclic shift indicator") from the UL allocation grant. One can apply any of the various kinds of gray mapping for cyclic shifts and transmit antennas (i.e., a predetermined cyclic shift for a certain transmit antenna). For example:
  "00" (or "0") antenna #1
  "11", (or "1") antenna #2
  "01", antenna #3
  "10", antenna #4
  The SIMO case would then always transmit "0" or "00" in the extra bit field.
  The 2×2 MIMO case would use "00" or "11" for the case that the two-bit signaling field is always reserved; otherwise "0" or "1" if only a one-bit field is used.
b) Utilize slightly different allocation grant signaling for SIMO and MIMO
  RLC signaling can be used to configure the presence of the "MIMO cyclic shift indicator". This is a cell-specific configuration.
    Configuration can be done also implicitly using the information on the cell-specific cyclic shift allocation (i.e., how many cyclic shifts are allocated in the given cell).
  A pre-defined code puncturing scheme can used to puncture the "MIMO cyclic shift indicator" into the existing UL allocation grant whenever needed.

As can be seen at FIG. 12, the MIMO cyclic shift indicator is disregarded by the UE operating in SIMO mode, as only a single antenna is used and the MIMO cyclic shift indicator bits "0" or "00" (if used) signaled to the SIMO UE with its UL resource allocation reflect the SIMO case cyclic shifting pattern. For the MIMO UEs (2×2 or 4×4) as seen at FIG. 12, the MIMO cyclic shift indicator bits that are signaled to the MIMO UEs with their UL resource allocations are used in conjunction with the gray mapping of part a) above or with some other RLC signaling to inform the MIMO UEs how they are to adjust their cyclic shifting pattern for the next UL transmission. The network/NodeB determines how a particular UE is to change its cyclic shift pattern, and signals it accordingly, so as to ensure conflicts/interference is avoided in the cell.

So from each ZC sequence multiple reference signals are derived with a cyclic shift of the sequence. Multiple UEs in the given cell share the same Zadoff-Chu sequence while keeping the orthogonality by using a UE specific cyclic shift as detailed above. But due to different bandwidths of UE UL allocations in neighboring cells as well as due to channel estimation which requires effectively partial correlation of the sequences, the ideal cross-correlation properties of ZC sequences are lost, resulting in unacceptable (partial) cross-correlation properties arising. Randomization by cyclic shift hopping and sequence hopping addresses this problem in part, as detailed above. However, coordination of the hopping patterns is seen as a further improvement to the solution detailed above.

An ideal solution for ZC sequence hopping and coordination would allow for efficient averaging of reference signal cross-correlation while maintaining low signaling overhead and a flexible structure. A flexible solution allows for cross-correlation randomization by ZC sequence hopping as above, but also for sequence coordination and also for combining the aspects of sequence hopping and coordination. Otherwise the solution would restrict the possibilities for network planning as well as for advanced receivers mitigating RS cross-correlations.

Several options have been previously proposed:

Sequence coordination. Since the number of available sequences is very limited with 1 resource block (RB) UL allocations, there are not sufficient sequences available to obtain acceptable partial cross-correlation properties in all scenarios. Since a large portion of cross-correlation values are unacceptably high for some sequence pairs, sequence coordination with cyclic shift hopping does not provide a sufficient solution either in all scenarios.

Sequence hopping. The proposed sequence hopping solutions result either in an inflexible solution, or in a large table of predefined sequence indexes, or in high signaling overhead.

However these solutions do not efficiently support both randomization by sequence hopping as well as coordination. The inventors are unaware of any prior art for a signaling arrangement that supports both randomization by sequence hopping and also sequence coordination.

It is noted that for intra-TTI sequence hopping, the length of the sequence hopping pattern is equal to the number of RS blocks within a TTI (two in the frame structures of FIGS. 1A and 1B), which we denote here as n, and the pattern is repeated periodically for each TTI. On the network side, the (e-)Node B 12 signals to the UE 10 the n sequence indexes for each possible UL allocation bandwidth. These sequence indexes are signaled on a radio resource control (RRC) message and/or on an eNodeB specific broadcast channel.

It is also possible to group the sequence indexes in a pre-determined way and just signal the group index instead of sequence indexes of a certain group. These sequence groups can be cell-specific. The groups can be configurable or hard-wired by the specification. It is also possible to perform sequence hopping outside the groups. This choice will increase the length of the hopping pattern in case that the number of sequences per group and bandwidth option is small (e.g., only 2). The UE 10 selects the used reference signal based on the bandwidth of the UL allocation and on the current RS block number. The cyclic shift hopping is applied on the top of sequence hopping/sequence coordination.

The signaling of the n sequence indexes is required for all UL allocation bandwidth options and, thus, may cause considerable signaling overhead. One option is two divide it into two parts. The first part contains n sequence indexes for the most essential allocation bandwidths and it may be signaled to the UE on a RACH response, as part of handover control signaling, and/or repeated relatively frequently on an e-NodeB specific broadcast channel. The second part contains n sequence indexes for the remaining allocation bandwidth options and it may be signaled to the UE on a radio resource control (RRC) message and/or repeated less frequently on an eNodeB specific broadcast channel.

The need for signaling is considerably smaller in case of pre-determined sequence groups. Signaling of the cell-specific sequence group can be done on a broadcast channel with limited number of bits. However, in case that sequence indexes within the groups are configured, considerable signaling is required.

This offers several advantages. While requiring relatively low signalling overhead, it allows for:

Both sequence coordination and sequence hopping are possible. In the sequence coordination, the same index/bandwidth is repeated n times. Sequence coordination may become an attractive option (e.g. in the case of an advanced e-Node B receiver) and is likely required for 1 RB UL allocations due to limited number of base sequences.

The scheme is flexible. The sequence hopping pattern can be defined during the network planning and, if needed, updated during the operation of the network.

Figure 17:
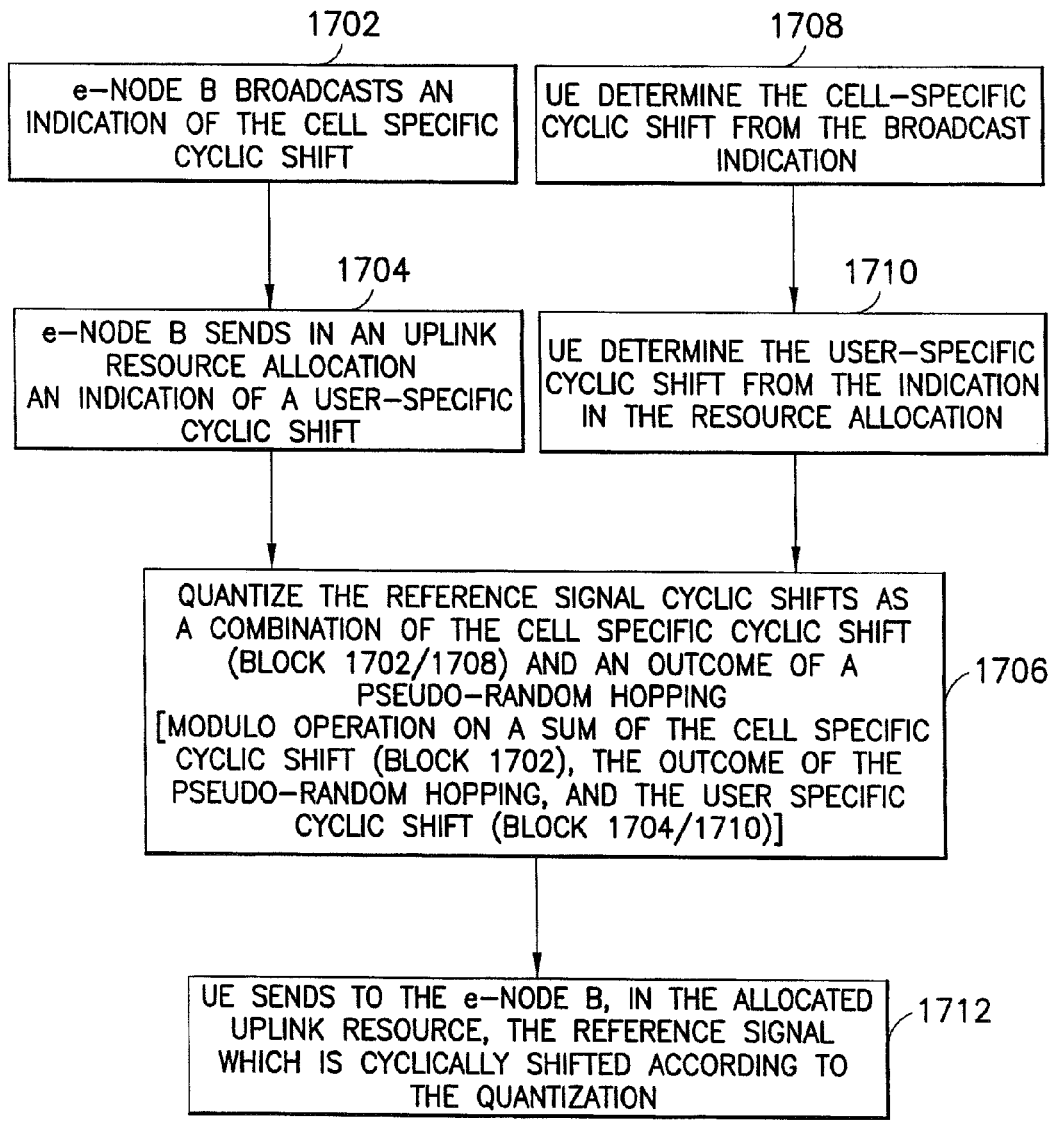
FIG. 17 is a process flow diagram according to an exemplary and non-limiting embodiment of the invention.

FIG. 17 is a process flow diagram according to one non-limiting embodiment of the invention. At block 1702 the e-NodeB broadcasts an indication of the cell specific cyclic shift. In the particular instance of FIG. 17 there are also user-specific cyclic shifts put into use, and so at block 1704 the e-NodeB sends to a particular user an indication of its user-specific cyclic shift in the uplink resource allocation for that particular user. Now (or earlier than either or both of blocks 1702 and 1704) the E-Node B quantizes at block 1706 the reference signal cyclic shifts as a combination of the cell specific cyclic shift which was indicated at block 1702 and the outcome of a pseudo-random hopping as seen at Equation [2] with the counterclockwise shift for slot 2. In an embodiment the cyclic shift is quantized as a modulo operation on a sum of the cell specific cyclic shift, the outcome of the pseudo-random hopping, and the user specific cyclic shift for which the indication was sent at block 1704. Now the particular user equipment receives at block 1708 the broadcast indication of the cell-specific cyclic shift, receives at block 1710 in its uplink resource allocation the indication of the user-specific cyclic shift, and computes its cyclic shift just as the e-NodeB did. At block 1712 the UE sends to the e-NodeB, in the uplink resource that was allocated to it and which bore the indication of the user-specific cyclic shift, the reference signal which is cyclically shifted according to the modulo operation on the sum of the cell specific cyclic shift, the outcome of the pseudo-random hopping, and the user specific cyclic shift. The e-NodeB receives that signal and recognizes it as the demodulation reference signal for that particular user for that particular uplink resource that it allocated to that user.

While described in the context of UTRAN-LTE, it is within the scope of the exemplary embodiments of this invention to use the above described UE 10 and e-Node B 12 procedures for other types of wireless networks and the teachings herein are not limited to a particular wireless communication protocol.

It will be appreciated that embodiments of this invention provide a method, a device, a computer program tangibly embodied on a computer readable memory and executable by a processor, and an integrated circuit, to store a first cyclic shift hopping pattern adapted for intra-TTI shifting, to store a second cyclic shift hopping pattern adapted for inter-TTI shifting within a physical resource unit, to apply the first cyclic shift hopping pattern to a CAZAC sequence and to apply the second cyclic shift hopping pattern to the CAZAC sequence, and to transmit the CAZAC sequence according to a cyclic shift pattern that combines the first and the second cyclic hopping patterns.

In a particular embodiment, the first cyclic shift pattern is for CAZAC sequence, is for block level spreading for a specific spreading factor, or is a combination of both CAZAC sequence and block level spreading. In another particular embodiment, the second cyclic shift pattern is for CAZAC sequence, is for block level spreading for a specific spreading factor, or is a combination of both CAZAC sequence and block level spreading. In an embodiment, separation of cyclic shifts for either or both of the first and second patterns is maximized with respect to adjacent shifts. In another embodiment, cyclic shifts as between two slots is maximized. In yet another embodiment, the shift of at least one slot is rotated so as to avoid cross correlation with an adjacent cell. In yet another embodiment, the cyclic shifts of the patterns is quantized according to a reference signal of a minimum bandwidth allocation. In another embodiment the pattern defines x cyclic shifts and is reused each 1/x, where x is a minimum demodulation reference signal length. In another embodiment the second pattern is periodic and defines a length equal to one radio frame. There are separate and simultaneous hopping patterns for base sequence hopping and for cyclic shift hopping, and the network may signal to a UE, by radio link control message or by broadcast message, which of n sequence indices of cyclic shift hopping patterns to use for its UL transmissions. These and other aspects are detailed above with particularity.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

We claim:

1. A method for operation of a wireless communications system, comprising:
   determining a cell specific cyclic shift from a received indication of the cell specific cyclic shift;
   determining a quantized cyclic shift of a reference signal as a combination of the cell specific cyclic shift with an outcome of a pseudo-random hopping; and
   sending a reference signal that is cyclically shifted according to the determined quantized cyclic shift.

2. The method of claim 1, wherein the quantized cyclic shift is determined using the cell specific cyclic shift, the outcome of the pseudo-random hopping, and a user specific cyclic shift.

3. The method of claim 2, wherein the indication of the cell specific cyclic shift is received over a broadcast channel, the method further comprising receiving an indication of the user specific cyclic shift in an uplink resource allocation and determining the user specific cyclic shift from the received indication of the user specific cyclic shift.

4. The method of claim 3, wherein the uplink resource allocation comprises an allocation table of an e-UTRAN system, and the reference signal that is cyclically shifted according to the determined quantized cyclic shift is sent in a resource allocated by the uplink resource allocation.

5. The method of claim 4, executed by a user equipment operating in an e-UTRAN system and where the reference signal comprises a demodulation reference signal.

6. The method of claim 2, wherein quantizing the cyclic shift comprises a modulo operation on a sum of the cell specific cyclic shift, the user specific cyclic shift and the outcome of pseudo-random hopping.

7. The method of claim 1, wherein the pseudo random hopping is cell specific.

8. The method of claim 1, wherein the cell specific cyclic shift operates to randomize cyclic shifts between transmission time intervals.

9. The method of claim 1, wherein the cyclic shift is quantized according to length of the reference signal.

10. The method of claim 9, wherein the sent reference signal that is cyclically shifted according to the determined quantized cyclic shift has cyclic shift according to:

cyclic_shift_symbol=(cyclic_shift_value*length of the reference signal)/12;

wherein cyclic_shift_value is between zero and eleven and cyclic_shift_symbol is the amount of cyclic shift given in reference signal symbols.

11. A non-transitory computer readable memory embodying a program of instructions executable by a processor to perform actions directed toward determining a cyclic shift of a reference signal, the actions comprising:
    determining a cell specific cyclic shift from a received indication of the cell specific cyclic shift;
    determining a quantized cyclic shift of a reference signal as a combination of the cell specific cyclic shift with an outcome of a pseudo-random hopping; and
    sending a reference signal that is cyclically shifted according to the determined quantized cyclic shift.

12. The non-transitory computer readable memory of claim 11, wherein the quantized cyclic shift is determined using the cell specific cyclic shift, the outcome of the pseudo-random hopping, and a user specific cyclic shift.

13. The non-transitory computer readable memory of claim 12, wherein the indication of the cell specific cyclic shift is received over a broadcast channel, and where the indication of the user specific cyclic shift is received in an uplink resource allocation.

14. The non-transitory computer readable memory of claim 13, wherein the uplink resource allocation comprises an allocation table of an e-UTRAN system, and the reference signal that is cyclically shifted according to the determined quantized cyclic shift is sent in a resource allocated by the uplink resource allocation.

15. The non-transitory computer readable memory of claim 12, wherein quantizing the cyclic shift comprises a modulo operation on a sum of the cell specific cyclic shift, the user specific cyclic shift and the outcome of pseudo-random hopping.

16. The non-transitory computer readable memory of claim 11, wherein the sent reference signal that is cyclically shifted according to the determined quantized cyclic shift has cyclic shift according to:

cyclic_shift_symbol=(cyclic_shift_value*length of the reference signal)/12;

wherein cyclic_shift_value is between zero and eleven and cyclic_shift_symbol is the amount of cyclic shift given in reference signal symbols.

17. An apparatus comprising:
at least one memory storing a program of computer instructions; and
at least one processor;
in which the at least one memory with the program of computer instructions is configured with the at least one processor to cause the apparatus to at least:
receive an indication of a cell specific cyclic shift;
determine from the received indication the cell specific cyclic shift, and to determine a quantized cyclic shift of a reference signal as a combination of the cell specific cyclic shift with an outcome of a pseudo-random hopping; and
send a reference signal that is cyclically shifted according to the determined quantized cyclic shift.

18. The apparatus of claim 17, wherein the at least one memory with the program of computer instructions is configured with the at least one processor to cause the apparatus to determine the quantized cyclic shift using the cell specific cyclic shift, the outcome of the pseudo-random hopping, and a user specific cyclic shift.

19. The apparatus of claim 18, wherein the at least one memory with the program of computer instructions is configured with the at least one processor to cause the apparatus to receive the indication of the cell specific cyclic shift over a broadcast channel, and further to receive an indication of the user specific cyclic shift in an uplink resource allocation; and further to determine the user specific cyclic shift from the received indication of the user specific cyclic shift.

20. The apparatus of claim 19, wherein the uplink resource allocation comprises an allocation table of an e-UTRAN system, and the at least one memory with the program of computer instructions is configured with the at least one processor to cause the apparatus to send the reference signal that is cyclically shifted according to the determined quantized cyclic shift in a resource that is allocated by the uplink resource allocation.

21. The apparatus of claim 20, wherein the apparatus comprises a user equipment operating in an e-UTRAN system and where the reference signal comprises a demodulation reference signal.

22. The apparatus of claim 18, wherein the at least one memory with the program of computer instructions is configured with the at least one processor to cause the apparatus to quantize the cyclic shift by a modulo operation on a sum of the cell specific cyclic shift, the user specific cyclic shift and the outcome of pseudo-random hopping.

23. The apparatus of claim 17, wherein the pseudo random hopping is cell specific.

24. The apparatus of claim 17, wherein the cell specific cyclic shift operates to randomize cyclic shifts between transmission time intervals.

25. The apparatus of claim 17, wherein the cyclic shift is quantized according to length of the reference signal.

26. The apparatus of claim 25, wherein the sent reference signal that is cyclically shifted according to the determined quantized cyclic shift has cyclic shift according to:

cyclic_shift_symbol=(cyclic_shift_value*length of the reference signal)/12;

wherein cyclic_shift_value is between zero and eleven and cyclic_shift_symbol is the amount of cyclic shift given in reference signal symbols.

27. The apparatus of claim 17, wherein the apparatus comprises an integrated circuit.

28. An apparatus comprising:
receiving means for receiving receive an indication of a cell specific cyclic shift;
determining means for determining from the received indication the cell specific cyclic shift, and for determining a quantized cyclic shift of a reference signal as a combination of the cell specific cyclic shift with an outcome of a pseudo-random hopping; and
sending means for sending a reference signal that is cyclically shifted according to the determined quantized cyclic shift.

29. The apparatus of claim 28, wherein:
the receiving means comprises a receiver;
the determining means comprises at least one digital processor; and
the sending means comprises a transmitter.

* * * * *